United States Patent [19]

Persson

[11] Patent Number: 4,471,424
[45] Date of Patent: Sep. 11, 1984

[54] APPARATUS AND METHOD FOR CONDITIONING GRAIN

[76] Inventor: Gleelynn W. Persson, Cherry St., Trimont, Martin County, Minn. 56176

[21] Appl. No.: 358,991

[22] Filed: Mar. 17, 1982

[51] Int. Cl.³ .................. G05D 23/32; F26B 21/10
[52] U.S. Cl. ............................ 364/145; 34/46
[58] Field of Search ............... 364/140, 141, 142, 143, 364/144, 145, 146, 147, 191, 420; 34/46, 44, 48, 54, 50; 98/54

[56] References Cited

U.S. PATENT DOCUMENTS

| | | | |
|---|---|---|---|
| 2,855,697 | 10/1958 | Barre | 34/46 |
| 2,935,009 | 5/1960 | Cloud | 98/54 |
| 3,408,747 | 11/1968 | Steffen | 34/15 |
| 3,861,054 | 1/1975 | Stahl | 34/48 |
| 4,053,991 | 6/1977 | Steffen | 34/54 |
| 4,148,147 | 4/1979 | Steffen | 34/50 |
| 4,200,910 | 4/1980 | Hall | 364/145 |
| 4,217,646 | 8/1980 | Caltaginone | 364/145 |
| 4,247,989 | 2/1981 | Steffen | 34/54 |
| 4,253,244 | 3/1981 | Kranzler | 34/48 |
| 4,356,641 | 11/1982 | Rosenau | 34/46 |
| 4,386,471 | 6/1983 | Bowney et al. | 34/46 |

Primary Examiner—Jerry Smith
Assistant Examiner—John R. Lastova
Attorney, Agent, or Firm—Henderson & Sturm

[57] ABSTRACT

Method and apparatus for conditioning grain with the aid of a digital computer. Preset ventilation and aeration start and stop times are provided with environment sensitive override conditions.

10 Claims, 13 Drawing Figures

APPARATUS AND METHOD FOR CONDITIONING GRAIN

TECHNICAL FIELD

This invention relates generally to apparatus and methods for drying and storing grain.

BAKCGROUND OF THE INVENTION

When harvested, grains such as corn, oats and wheat include a certain quantity of moisture. Upon storing such grain, the combination of moisture released and heat generated by the metabolic activities of the individual seeds will conspire to quickly rot the grain and make it useless for feed or other processing.

To prevent this, many operators use low temperature drying methods of removing heat and moisture from stored grain. Such methods work well to cure grain and make it suitable for storage, but the method also requires high energy usage. Typically, fans and infrared lamps operate around the clock in a low temperature drying type of operation.

Once grain has been cured and the moisture content and metabolic activity of the grain has been reduced to appropriate levels, the low temperature drying process will usually be terminated. During the storage period, however, the grain should still be aerated from time to time to keep it well preserved and sweet.

Aerating such grain during the various seasons of storage (winter, spring and summer) can give rise to problems. The temperature equilibrium of the grain may be disturbed. Perhaps worse, moistrue may be reintroduced into the grain and condensation may form thereon. To date, unless the operator wishes to incur the expense of preconditioning the aeration air, he must risk such eventualities.

DISCLOSURE OF THE INVENTION

The instant invention provides a method and apparatus for achieving the quality of grain that results from a low temperature drying process, without the same overall attendant energy expenses. The invention also provides for storing grain during the different seasons without risking undue heat exchange or condensation.

The invention provides three primary modes of operation: low temperature drying, energy exchange and storage aeration.

Low temperature drying constitutes a process whereby unstable freshly harvested grain may be processed to attain a more stable condition. To achieve this, grain stored in an appropriate bin will be exposed to continuous or nearly continuous ventilation. Large grain drying fans provide such ventilation.

Such ventilation will remove heat from the grain by evaporating moisture out of the seeds. By cooling the grain down, metabolic activity in the grain will slow down. In consequence, the seeds give off moisture more slowly.

The fans should be run all day long during this mode, except that they may be shut down for a few hours in the early evening. A brief cessation of ventilation will not harm the curing grain, and in this way energy usage during the hours of peak demand may be minimized. When restarting the fans, the applicant provides a delay period between each fan start up to avoid a high and possibly detrimental current surge.

During the low temperature drying process, the applicant monitors the temperature of ambient air outside the curing bin and of air inside the curing bin proximal the apex of the ceiling. The applicant also provides infrared grain drying lamps that operate whenever the interior temperature does not exceed the ambient temperature less 4° F.

After a few days of such low temperature drying, the grain will have been essentially stabilized. More importantly, a horizontal area of dry grain having an average moisture content of approximately 14-16% will be established at the bottom of the bin. Between this area of dry grain at the bottom and non-dry grain at the top, a horizontal layer of grain may be found where the curing process is most evident. This area may be referred to as the curing zone.

The low temperature drying operation could be continued beyond the time mentioned above and the grain completely dried through this process. This would result in high energy consumption, however. At this point, the applicant terminates the mode 1 operation of modified Chillcuring and begins mode 2 energy exchange.

The energy exchange mode exploits the heat energy stored in the already dried grain during the daylight hours. During the daytime when outside air is warmest, ventilation air moves through the grain and continues to remove moisture from curing grain in and above the curing zone by evaporation. The grain continues to dry from the bottom up.

As this occurs, already cured grain below the curing zone absorbs heat from the ventilation air. Grain in and above the curing zone will be somewhat cooler due to the evaporative process.

In mode 2, the fans are stopped in late afternoon during or near the warmest part of the day. The warmed cured grain will remain warm and the cooled curing grain will remain relatively cool.

The fans remain off until the outside temperature drops during the night to at or near the daily low. At this time, the fans are automatically started and the cooler night time air will be used to ventilate the grain.

Typically cool night time air will not dry grain well because of its lower temperature and reduced ability to absorb additional moisture. This air must first pass through the warm cured grain, however. Incoming ventilation air that contacts this grain will warm up, enabling it to hold more moisture.

Gradually, this heat in the cured grain becomes transferred to the curing grain located higher in the bin. At this point, the curing grain will be warm and damp. Outside air entering the bin will now absorb little or no moisture through the lower and middle layers because these layers are at or near the same temperature.

As the ventilation air reaches the warm damp grain on top, the grain will warm the air and allow it to absorb moisture from that grain. Time will progress until the sun rises and the outside temperature begins to rise again. By this time the energy exchange process between the layers of grain has been completed and drying will continue through the normal evaporative process.

By choosing the start and stop times for the fans and lamps, the applicant must of course make certain assumptions regarding daily temperature patterns that may not hold true on a particular day. If the system were to restart the fans at night when for some reason the ambient temperature had substantially elevated in the meantime (rather than lowering as would normally be expected), then the conditioning process might be hampered rather than aided.

To protect against such aberrations, the applicant records the ambient temperature at the time the fans are stopped. The applicant then continues to monitor the ambient temperature. A safe temperature constant will be provided (such as 7° F.) and this number may be added to the ambient temperature recorded at the time the fans were stopped. The applicant will then compare the current ambient temperature at the time the fans should start with this number. If the current ambient temperature exceeds this temperature range, then the fans will not be started.

The applicant continues to monitor ambient temperature, and at such time as the current ambient temperature appears less than the safe temperature range, the fans will be initiated. Since it may be just as detrimental to leave the fans off for an extended period of time, the applicant also provides an automatic override start time; typically, 8:00 a.m. Therefore, even if the ambient temperature remains elevated, the fans will still be started at 8 o'clock in the morning or at such other time as may appear appropriate.

Mode 2 energy exchange should continue until the top four feet of the grain mass exhibit a moisture content of approximately 14% to 16%. At this time, the grain has been suitably dried and the drying process may be terminated. The applicant now begins mode 3 operation which provides for automatic aeration during the storage period.

Typically, grain may be stored during the winter, spring and possibley through the summer seasons. Through all of these seasons, the grain must be occasionally aerated to maintain the quality of the grain. Without the due exercise of care, however, the introduction of outside air into the grain mass may induce condensation therein. Such condensation may rapidly degrade the grain during storage. Therefore, the applicant provides for automatically aerating the grain mass at preset intervals for preset periods of time with override instructions being applicable should inappropriate weather conditions exist.

During the winter months, the applicant automatically starts the grain drying fans every 10 to 14 days. The fans will then be run for a preset period of time, such as 10 hours. Before starting the fans, however, the applicant monitors both temperature and humidity. The fans will only start if the ambient temperature falls between 10° F. and 30° F. and if the humidity falls between 60% and 80%.

In addition, the fans will be automatically stopped if the ambient temperature rises above 40° F. Should this occur, the fans will not start again until the temperature drops below 30° F. Upon reaching 30° F., the fans will restart and continue to run until the preset time to conclude.

If the total run time for the fans does not exceed hours, the fans will automatically restart again the next day at the preset start time, assuming the specified weather conditions are met. If for some reason the run cycle again does not exceed 4 hours, then the operator will try again the next day and so forth until a run cycle of more than 4 hours has been completed.

Following the completion of a successful run, the applicant's invention will then remain quiescent until the next scheduled run.

During the spring months, the unit runs in a similar manner, except that during this time period the fans will not start unless the temperature falls between 25° F. and 35° F., and the humidity falls between 55% and 80%. No cutoff temperature is provided.

During the summer months, the temperature must fall between 40° F. and 65° F. before the fans will be allowed to start. Similarly, the humidity must exceed 65%. As with the spring mode, no cutoff temperature exists once the fan has begun operating.

The applicant also provides that should the temperature of the corn mass ever exceed 80° F., the fans will begin operation and will continue until the temperature of the grain mass drops below 60° F.

To accomplish all of the above, the operator provides a computer controlled grain curing system. This system includes environment sensing units that monitor ambient temperature, the temperature of the grain mass and the temperature of air exhausting from the grain bin. The applicant also provides the computer with a real time clock and calendar. The computer then controls the grain drying fans and lamps in accordance with the operating parameters described above.

The quality of grain obtained by use of this two step drying process has been consistently high. In addition, the energy savings have been dramatic. Where grain dried through use of the low temperature drying process alone may cost more than 30 cents per bushel to dry, grain that has been dried through the applicant's process will cost about 3 cents per bushel to dry.

BRIEF DESCRIPTION OF THE DRAWINGS

These and other attributes of the invention will become more clear upon a thorough review of the following description of the best mode for carrying out the invention, particularly where the best mode description is reviewed in conjunction with the drawings, wherein.

BEST MODE FOR CARRYING OUT THE INVENTION

Figure 1:
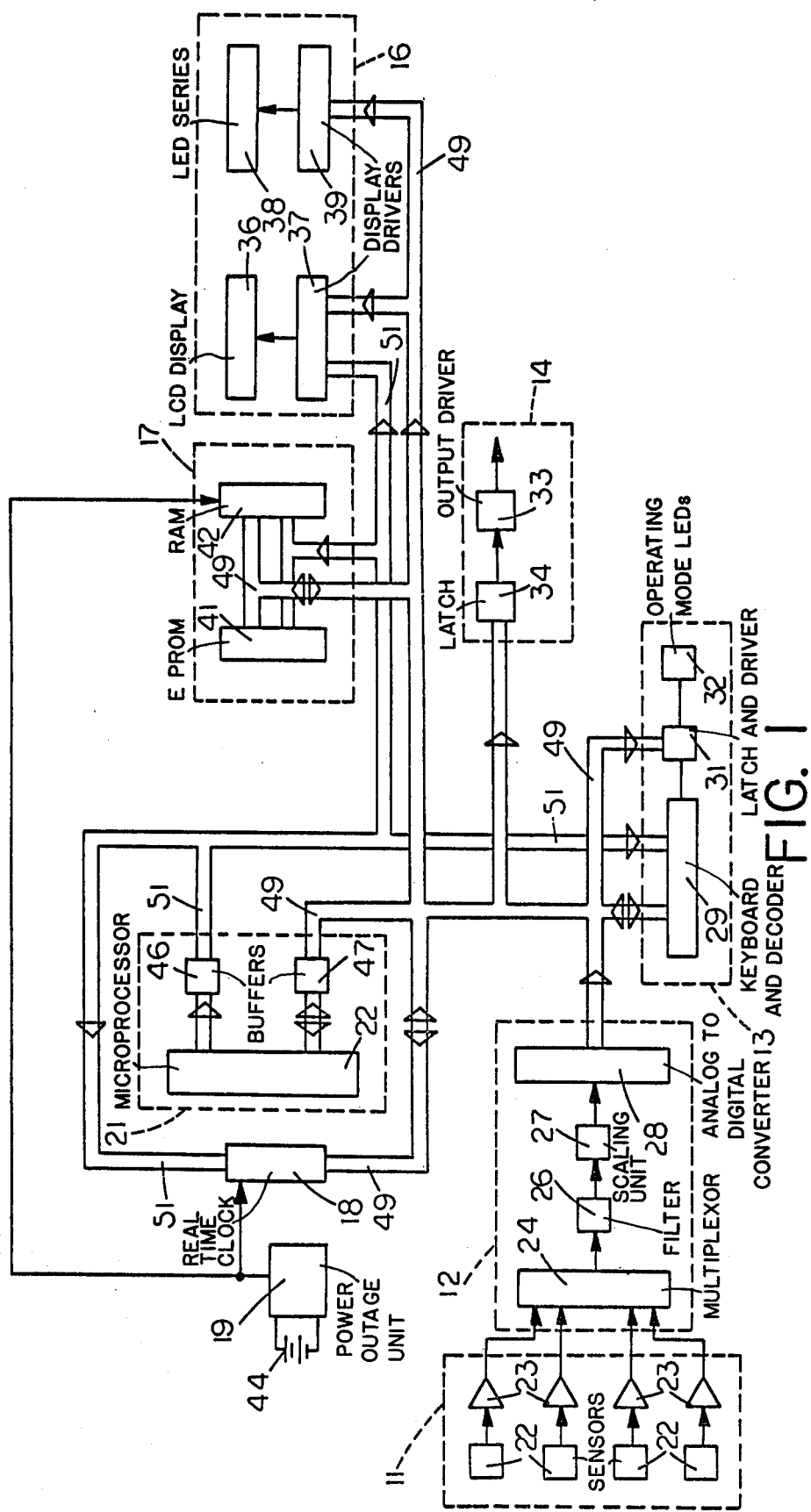
FIG. 1 is a block diagram of the apparatus.

Referring now to FIG. 1, the microprocessor control system of the invention will now be generally described. This system includes generally an environment sensor unit (11), a data conditioning unit (12), a keyboard unit (13), an output control unit (14), a display unit (16), a memory unit (17), a real time clock unit (18), a power outage unit (19) and a central processing unit (21).

Figure 12:
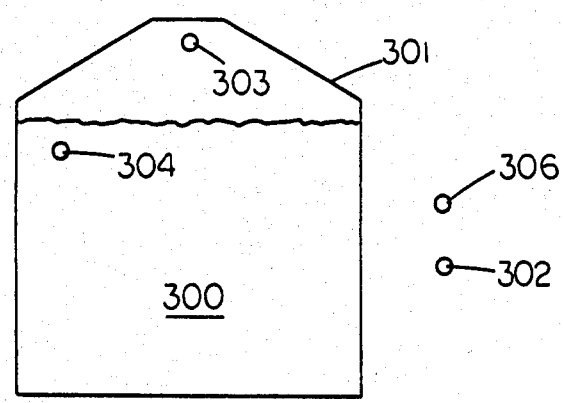
FIG. 12 is a block diagram representation of a grain bin.

The environment sensor unit (11) includes sensors (22) that create voltage signals relating to the temperature at various monitored locations, such as outside (302) (FIG. 12) the grain drying bin (301), at the interior apex (303) of the bin (301), and within (304) the grain (300) itself. Such sensors may be obtained by use of temperature sensitive semi-conductors. These semi-conductors yield a substantially constant current at their output and an output voltage that relates to the monitored temperature as measured in degrees Kelvin.

Similarly, a voltage relating to exterior humidity may be obtained by use of a humidity sensitive semi-conductor.

The small voltage issued by these sensors (22) are each separately amplified by an amplifier (23) provided for each input.

The input sensors (22) and amplifiers (23) of the environment sensor unit (11) connect to the inputs of a multiplexor unit (24) included in the data conditioning unit (12). The multiplexor (24) operates to allow only one incoming data signal at a time to be introduced into the microprocessor (22) and thereby assures accuracy and non-confused data.

Because the system depicted operates relatively slow compared to other data processing systems, the system may be more susceptible to quickly varying sensor readings. Since quickly varying sensor readings are not important data in this application, the applicant provides a filter (26) in the data conditioning unit (12) to filter out noise and to essentially average the incoming signal such that the microprocessor (22) will only receive data relating to the average of each incoming signal.

This average would only be representative of a sample taken over a short period of time. This ensures that the microprocessor (22) will remain responsive to absolute variations of temperature of humidity, but not to short aberations caused by noise or unusual environmental conditions not of concern due to their brevity.

The output of the filter (26) connects to a scaling unit (27). This scaling unit (27) operates to convert the temperature responsive signals from the Kelvin to Fahrenheit scale. By initially converting to Fahrenheit the temperature readings may be easily displayed in Fahrenheit as well.

Finally, the data conditioning unit (12) includes an analog-to-digital converter (28) that connects to the scaling unit (27) output. The converter (28) operates to translate the analog signals relating to temperature and humidity into a digital signal. This digital signal may then be used by the microprocessor unit (22).

To provide operator interaction with the system, a keyboard unit (13) that includes a manual keyboard and decoder unit (29) has been provided. The keyboard includes twenty keys, some of which have dual function modes. A latch and driver mechanism (31) controls operating mode LEDs (32) associated with the keyboard.

The output control unit (14) provides means whereby the fans and lamps of the conditioning system are controlled by an output driver (33). The output driver (33) connects through a latch (34) to the remainder of the system as described below.

The output display unit (16) has a four digit LCD display (36) that provides an operator viewable display. Display driver unit (37) drives the LCD display (36). A display indication LED series (38) provides visual indicia of what function or sensor is being displayed on the display. A driver unit (39) controls the display indication unit (38).

The memory unit (17) consists of both volatile and non-volative memory. The non-volatile memory includes EPROM memory (41) and the volatile memory includes RAM memory (42). The preprogrammed software for the microprocessor (22) may be stored in the non-volatile memory. Current data and operator controlled functions may be stored in the volatile memory.

The real time clock unit (18) provides for a real time clock. The real time data generated by this unit (18) may be used by the microprocessor (22) to determine at what times the fans should be turned on and off.

In the event that power to the system should be lost, the applicant has provided a power outage unit (19). This unit (19) operates to recharge a battery (44) during normal operation. During times when power has been cut off to the system, the power outage unit (19) will allow the battery (44) to continue to operate the real time clock unit (18) and to continue to sustain the volatile memory. Other functioning units of the system, however, will be inoperative. By this provision, the system can be without external power for approximatly three days. If external power can be restored during this time, it will not be necessary to recalibrate the real time clock unit (18) or to reprogram the volatile memory.

The central processing unit (21) includes very generally a microprocessor (22), an address buffer (46) and a data buffer (47).

The microprocessor (22) connects through the data buffer (47) to a data buss (49). This data buss (49) connects to the analog-to-digital converter (28), the keyboard unit (13), the real time clock unit (18), the output control unit (14), the memory unit (17) and the output display unit (16). In addition, the microprocessor (22) connects through the address buffer (46) to an address buss (51). This address buss (51) connects to the keyboard unit (13), the real time clock (18), the memory unit (17) and the output display unit (16).

So configured, the central processing unit (21) can receive digitized data from the environmental sensor unit (11) through the data conditioning unit (12) and the data buss (49). The central processing unit (21) can also receive data regarding real time from the real time clock unit (18), operator input information from the keyboard unit (13) and programming instructions and operational data from the memory unit (17). In addition, the central processing unit (21) can forward data through the data buss (49) to the keyboard unit (13), the output control unit (14), the memory unit (17), and the output display unit (16).

Figure 2:
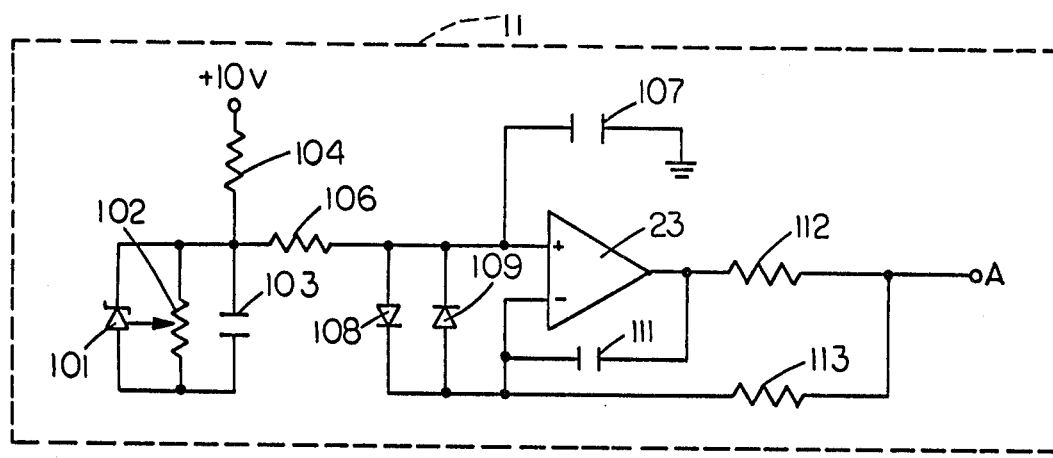
FIG. 2 is a schematic representation of the environment sensor unit.

The details of the construction of this sytem will now be described in greater detail with reference to FIGS. 2 through 11. Referring now in particular to FIG. 2, the environment sensor unit (11) will be described first.

Since the individual sensor and amplifier circuits are identical, only one need be described in detail. The temperature sensors themselves may be formed of an LM355 part, such as that manufactured by the National Semi-Conductor Company. Such a sensor may be schematically represented as a Zenor diode as indicated in FIG. 2 by the numeral 101. A 10k ohm resistor (102) may be connected in parallel across the sensor (101). By connecting the adjustment port of the sensor (101) to the variable leg of the resistor (102), the sensor (101)

may be calibrated to ensure accurate performance. A 33 microfarad capacitor (103) may also be connected in parallel across the sensor (101) to assist in filtering out unwanted signals. In addition, a 5k ohm pull up resistor (104) may be connected between the output of the sensor (101) and a positive 10 volt source.

The sensor output connects through a 10k ohm resistor (106) to the non-inverting input of an amplifier section (23). Filtering may be provided by connecting a 0.01 microfarad capacitor (107) between the non-inverting input of the amplifier (23) and ground.

A pair of parallel connected back-to-back diodes (108 and 109) link the non-inverting input of the amplifier (23) to the inverting input thereof. A 0.01 microfarad capacitor (111) may be connected between the inverting input and the output of the amplifier (23).

A 2k ohm resistor (112) connects between the output of the amplifier (23) and the output node (denoted by the character A) of the environment sensor unit (11). Finally, a 10k ohm feedback resistor (113) connects between the output node (A) and the back-to-back diodes (108 and 109).

Figure 4:
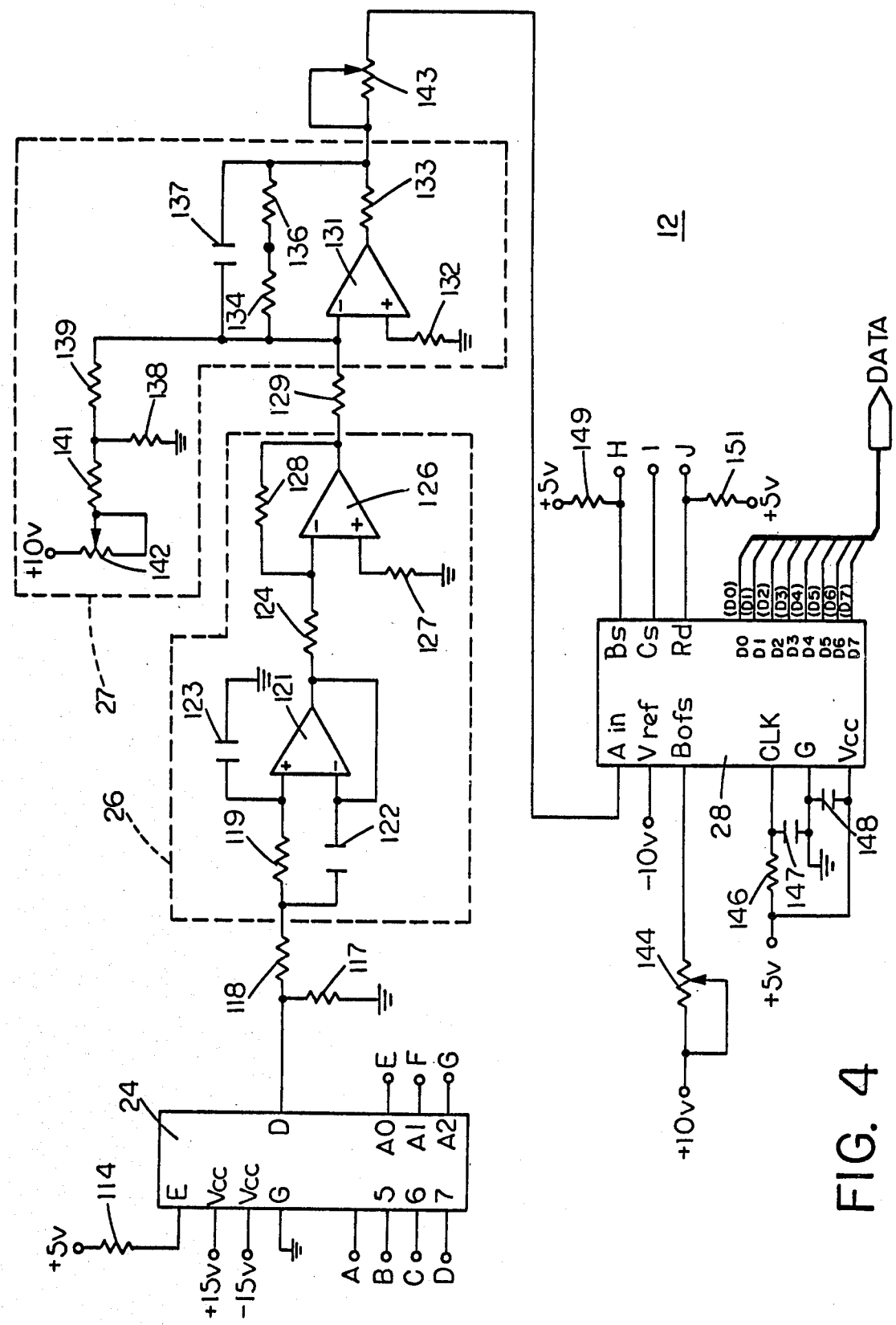
FIG. 4 is a schematic representation of the data conditioning unit.

With reference to FIG. 4, the output nodes of the four sensors in the environment sensor unit (11) connect to separate data input ports of a multiplexer (24) contained in the data conditioning unit (12) as denoted by the characters A, B, C and D. The enable port of the multiplexer (24) may be connected to a positive 5 volt source through a 1k ohm resistor (114). The ground port may be connected to ground, and the $V_{cc}$ and negative $V_{cc}$ ports may be appropriately connected to positive and negative 15 volt sources, respectively.

The three address ports of the multiplexer (24) connect where denoted by the characters E, F and G to the output ports of a four bit D latch (116) (FIG. 12) contained in the central processing unit (21) and described in greater detail below. Finally, the data port of the multiplexer (24) connects through a voltage divider network that includes a grounded 1m ohm resistor (117) and a 10k ohm resistor (118) to the input of a filter unit (26).

The input to the filter unit (26) connects through a 10k ohm resistor (119) to the non-inverting input of a first operational amplifier (121) and through a 0.022 microfarad capacitor (122) to the inverting input of that same amplifier (121).

In addition, the inverting input connects to the output of the amplifier (121) and the non-inverting input connects through a 0.01 microfarad filtering capacitor (123) to ground. The output of the first operational amplifier (121) then connects through a 10k ohm resistor (124) to the inverting input of a second operational amplifier (126).

The non-inverting input of the second operational amplifier (126) connects through a 4.99k ohm resistor (127) to ground. In addition, a 10k ohm feedback resistor (128) connects between the output and the inverting input of the second operational amplifier (126). The output of the second operational amplifier (126) constitutes the output of the filter unit (26), and connects through a 10k ohm resistor (129) to the input of the scaling unit (27).

The input of the scaling unit (27) connects to the inverting input of an operational amplifier (131). The non-inverting input of this amplifier connects through a 10k ohm resistor (132) to ground. The output of the operational amplifier (131) connects through a 1k ohm resistor (133) to an output node (135). A series connected 133k ohm resistor (134) and a 20k ohm resistor (136) connect between the output node (135) and the inverting input of the operational amplifier (131). In addition, a 220 picofarad capacitor (137) connects in parallel with the two series connected resistors (134 and 136).

The inverting input of the operational amplifier (131) also connects through a voltage divider network consisting of a grounded 10k ohm resistor (138) and a second 10k ohm resistor (139) to a bias adjustment network. The bias adjustment network includes a 9.09k ohm resistor (141) that connects to the variable leg of a 5k ohm resistor (142) having one leg connected to the variable leg and the remaining leg connected to a positive 10 volt source.

The output node (135) of the scaling unit (27) then connects through a 2k ohm variable resistor (143) to the analog input port of an analog-to-digital converter (28). Such an analog-to-digital converter may be provided by use of an AD7574JN part.

The reference voltage input of the converter (28) connects to a negative 10 volt reference source. The $B_{o/s}$ port connects through 2k ohm variable resistor (144) to a positive 10 volt source. The clock port connects through a 200k ohm resistor (146) to a positive 5 volt source and through a 100 picofarad capacitor (147) to ground. In addition, the $V_{cc}$ port connects to the positive 5 volt source and through a 1 microfarad capacitor (148) to ground.

The Bs and Rd ports connect through 10k ohm resistors (149 and 151) to a positive 5 volt source. In addition, The Bs, Cs and RD ports all connect to the central processing unit (21) as described in more detail below and as denoted by the characters H, I and J.

Finally, the eight data output ports that carry the digitized information representing the analog input are connected to the eight data lines $D_o$ through $D_7$) of the data buss (49) as indicated by the expression DATA. The data lines of the data buss (49) connect to other units and components as described more fully below.

The keyboard unit (13) will now be described with reference to FIG. 5. The two primary elements of the keyboard unit (13) are a keyboard switch assembly (152) and a decoder system (153).

The decoder (153) may be a 74LS154 four-to-sixteen bit decoder. Its $V_{cc}$ port may be connected to a positive 5 volt source and the ground port may be grounded. The four address ports connect to address lines $A_o$ through $A_3$ of the address buss (51) as denoted by the characters ADD. In addition, the address ports that connect to the $A_0$ and $A_1$ address lines of the address buss (51) are connected to two address input ports of the display unit (16) as denoted by the characters N and P (see FIG. 8) and as described in more detail below.

The decoder (153) outputs are connected through inverters (154) and through parallel connected 10k ohm pull up resistors (156) (represented here as an SIP package) to the keyboard switch assembly (152). Finally, the two enable gates of the decoder (153) are attached as described below to NAND gates.

The keyboard switch assembly (152) includes two opposing sets of ten normally open push-button switches (157). Each switch (157) has two poles. One pole of each such switch (157) connects through a pull up 3.3k ohm resistor (158) to a positive 5 volt source. In addition, the first set (159) of ten switches (157) has its commonly joined poles connected to the input of a buffer (161) and to one input of a debouncer unit (162).

Similarly, the second series (163) of switches (157) have their commonly connected poles attached to a second buffer (164) and to a second input of the debouncer unit (162).

The remaining pole of each switch (157) attaches in common with the pole of the switch (157) in the opposing series. Therefore, one pole of the first switch (157) of the first series of switches (159) attaches to one pole of the first switch (157) of the second series of switches (163). The second switches (157) of both series of switches (159 and 163) are similarly attached and so forth.

Each pair of poles connected between opposing switches (157) then connects through the pull up resistor network (156) and the inverter network (154) to an output of the decoder (53) as noted above.

The output of the first buffer (161) that connects to the first series (159) of switches (157) constitutes the $D_0$ data line and connects to the data buss (49). Similarly, the remaining buffer (164) that connects to the second series (163) of switches (157) constitutes at its output the $D_1$ data line and also connects to the data buss (49).

These buffers (161 and 164) may be provided by use of a three state octal buffer part such as the 74LS241. The $V_{cc}$ port of this part may be connected to a positive 5 volt source and also through a 10 microfarad capacitor (166) to pin 10 of that part. The enable output connects to the output of a NAND gate as described further below.

The debouncer unit (162) that the two series of switches (159 and 163) attach to may be an MC14490 debouncer part. The $V_{cc}$ port of the debouncer unit (162) may be connected to a positive 5 volt source. Pin 7 may be connected to pin 9 through a 0.01 microfarad capacitor (167). Finally, the two utilized output ports may be connected to a NAND gate as described below.

The keyboard unit (13) also contains a variety of logic elements, including a number of NAND gates, inverters and a one shot monostable multi-vibrator. These elements will now be described.

A first set of four two input NAND gates may be supplied by use of 74LS00 quad two input NAND gate part (168). The first NAND gate (169) in this part (168) has a first input that connects to one output of the debouncer unit (162) and a second input that connects to the remaining output of the debouncer unit (162). The output of this first NAND gate (169) then connects to one input of the second NAND gate (171).

The remaining input to the second NAND gate (171) connects to the enable ports of the decoder (153). In addition, this NAND gate input also connects to the ouput of a one-of-sixteen decoder/demultiplexer (172) contained in the central processing unit (21), as described in detail below and as denoted by the character Q. The output of this second NAND gate (171) connects as denoted by the characters MM to an input port of a peripheral interface adapter (173) also contained in the central processing unit (21) as described in detail below.

The third NAND gate (174) has a first input that connects to the first input of the fourth NAND gate (176), through a 3.3k ohm pull up resistor (177) to a positive 5 volt source, and through an inverter (178) to both of the enable ports of the decoder (153). The remaining input to the third NAND gate (174) connects to the central processing unit (21) as denoted by the character K and as described more fully below. The output of the third NAND gate (174) connects to the enble input of the three state octal buffer part that connects to the output of the keyboard switch apparatus (152) as described above.

The remaining input to the fourth NAND gate (176) may be connected to the output of a one shot monostable multi-vibrator (179) described below. The output of the fourth NAND gate (176) may be connected to a positive 5 volt source and to the clock input of a hex D flip flop part (181) associated with the latch and driver (31) of the keyboard unit (13) as denoted by the character L.

Finally, it may be mentioned that the $V_{cc}$ port of the NAND gate part (168) may be connected to a positive 5 volt source, the ground port may be grounded, and a 10 microfarad capacitor (182) may be connected therebetween.

The one shot monostable multi-vibrator (179) may be provided by part 74121. The $V_{cc}$ port may be connected to a positive 5 volt source and to pin 5. The ground port may be grounded and a 0.1 microfarad capacitor (183) may be connected between ground and pin 5. The two input ports may be connected in parallel and through a 10k ohm pull up resistor (186) to a positive 5 volt source and to the output of a NAND gate (199) described below.

The capacitor input port to the one shot (179) may be connected through a 100 picofarad capacitor (184) to the resistor/capacitor port. The resistor/capacitor port may be connected through a 5.62k ohm resistor (187) to a positive 5 volt source. Finally, the output port of the one shot (179) may be connected to the input ports of three NAND gates (196, 197 and 198) described below, and to the central processing unit (21) as denoted by the character M and as described in more detail below.

Three inverters may be provided by use of hex inverter part 74LS04 as depicted by the numeral 188. The first inverter (189) so provided has an input designated by the character R that connects to the central processing unit (21) as described below. The second inverter (191) has an input designated by the character S that also connects to the central processing unit (21) as described below. Finally, the third inverter (192) has an input that connects to the central processing unit (21) as designated by the character T. The $V_{cc}$ port of the hex inverter part (188) may be connected to a positive 5 volt source, the ground port may be connected to ground, and a 0.1 microfarad capacitor (193) may be connected therebetween.

Four NAND gates may be provided by quad two input NAND gate part 74LS1 (194). Both inputs of the first NAND gate (196), and one input each of the third and fourth NAND gates (197 and 198) are connected as mentioned above to the output of the one shot monostable multi-vibrator (179).

One input of the second NAND gate (199) connects to the central processing unit (21) as designated by the character U and as described more fully below. The output port of the first inverter (189) described above connects to the remaining input of the second NAND gate (199). The output of the second inverter (191) connects to the remaining input of the third NAND gate (197) and the output of the third inverter (192) connects to the remaining input of the fourth NAND gate (198).

The $V_{cc}$ port of the NAND gate part (194) connects to a positive 5 volt source, the ground port connects to ground, and a 0.1 microfarad capacitor (201) connects therebetween.

The output of the first NAND gate (196) connects to the second chip select port of a four digit display decoder/driver (202) retained in the display unit (16) as described below and as denoted by the character V. The output of the second NAND gate (199) connects to the two input ports of the one shot monostable multivibrator (179) as described above. The output of the third NAND gate (197) connects to the clock input of a hex latch part (203) contained in the display unit (16) as described below and as referenced by the character X. Finally, the output of the fourth NAND gate (198) connects to the clock input of a hex D flip flop associated with the latch and driver unit (39) of the display unit (16) and as referenced by the character W.

Figure 6:
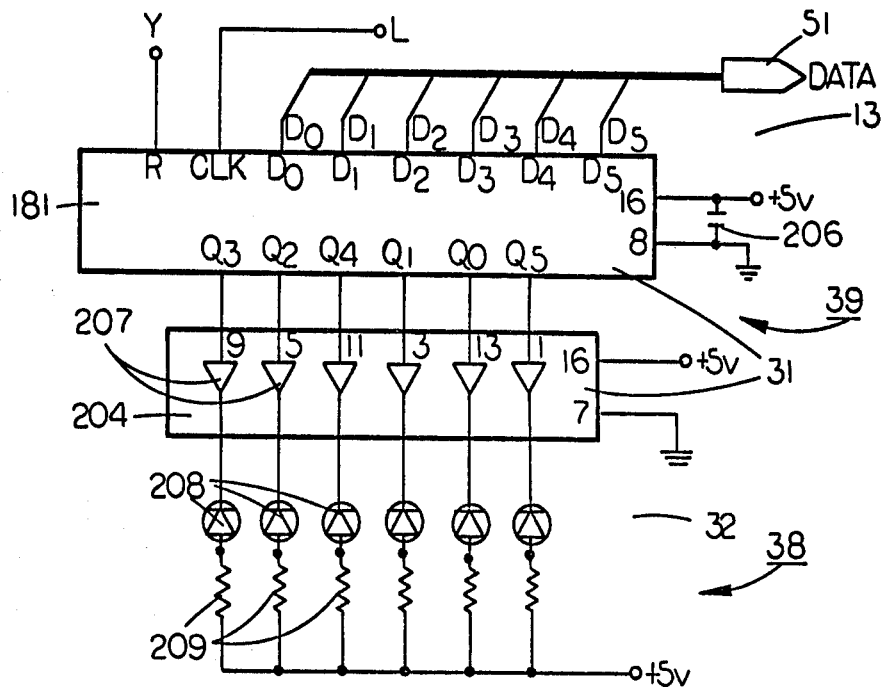
FIG. 6 is a continued schematic representation of the keyboard unit.

Referring to FIG. 6, the latch and driver (31) of the keyboard unit (13) includes a hex D flip flop part 74SL174 (181) and a hex inverter driver part 7406 (204). The hex D flip flop (181) has a reset port connected to the microprocessor (22) reset port as described in more detail below. The six data input ports are connected to data lines $D_o$ through $D_5$ of the data buss (49).

The $V_{cc}$ port connects to a positive 5 volt source, the ground port may be grounded, and a 0.1 microfarad capacitor (206) may be connected therebetween.

The six output ports of the hex D flip flop (181) each connect to a separate inverter (207) contained in the hex inverter driver (204). The $V_{cc}$ port of this part (204) may be connected to a positive 5 volt source and the ground port may be grounded. The output of each inverter (207) then connects through its own series connected LED (208) and current limiting 120 ohm resistor (209). Each of these six pairs of LEDs (208) and resistors (209) are then connected in parallel to a positive 5 volt source.

Figure 7:
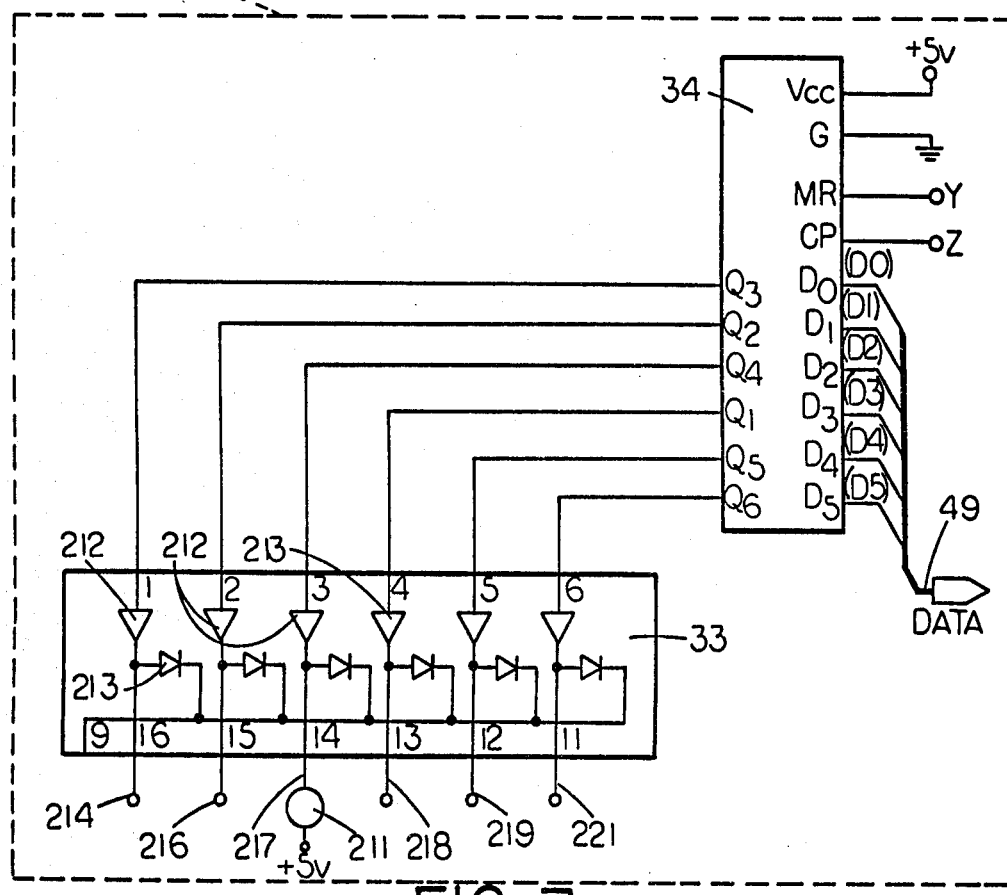
FIG. 7 is a schematic representation of the output control unit.

Referring now to FIG. 7, the output control unit (14) will be described. As noted above, the output control unit (14) includes generally a latch (34) and an output driver (33). In addition, the output control unit (14) includes a buzzer (211).

The latch (34) may be a six bit latch such as part 74LS174. The $V_{cc}$ port of the latch (34) may be connected to a positive 5 volt supply and the ground port may be grounded. The reset port of the latch (34) may be connected to the reset port of the microprocessor (22) as denoted by the character Y. The CP port of the latch (34) may be connected to the central processing unit (21) as denoted by the character 7 and as described more fully below. The six data input ports may be connected to data lines $D_o$ through $D_5$ of the data buss (49). Finally, the six data output ports each connect to an input of the output driver (33).

Each input to the output driver (33) connects through an inverter (212) to an output. In addition, the output of each inverter (212) connects through a diode (213) to a common bias port. This diode configuration may be utilized to clamp the output of the output driver (33).

The first output (214) of the output driver (33) connects to a fan drive return circuit. The second output port (216) connects to a grain drying lamp drive return circuit. The third output port (217) connects to a buzzer (211) having its oppoing lead connected to a positive 5 volt source. The fourth, fifth and sixth output ports (218, 219 and 221) have been retained as spare drive outputs.

Figure 8:
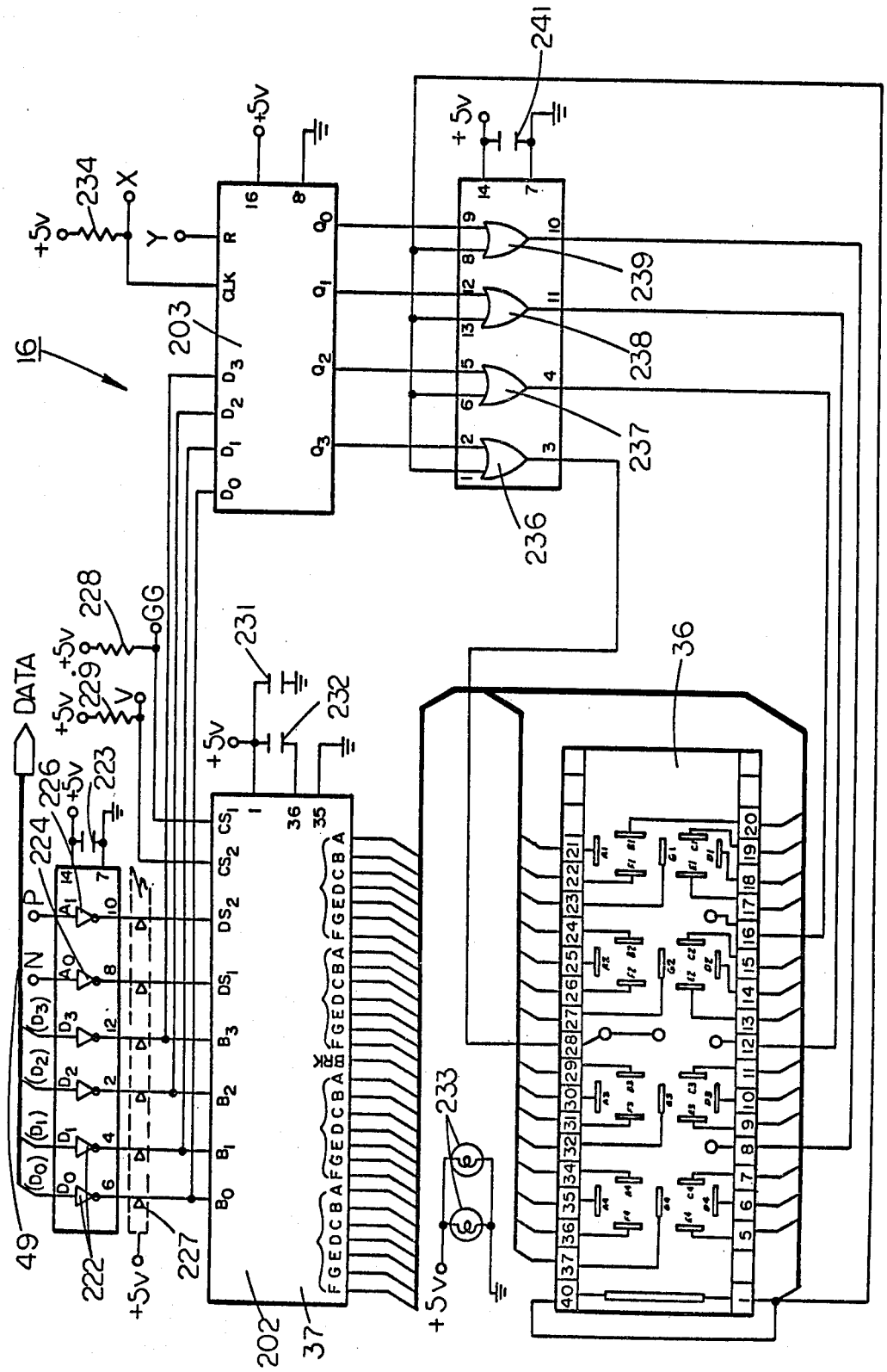
FIG. 8 is a schematic representation of the display unit.

Referring now to FIG. 8, the display unit (16) will now be described. As noted above, the display unit (16) includes generally a four digit LCD display (36), a display driver (37), display indication LEDs (38) (FIG. 6) and a latch and driver (39) (FIG. 6).

The four digit LCD display (36) may be comprised of any suitable prior art four digit seven segment liquid crystal display unit. Such displays are well known in the prior art and no detailed description need be given here relating to same, suffice to note that a display appropriate for use with this invention should have four discreet digits separated by addressable decimal points and with an addressable colon centrally located between the two center digits.

Display data may be carried on data lines $D_0$, $D_1$, $D_2$ and $D_3$ on the data buss (49). Each of these data lines connects to a separate buffer input (222). Such buffers (222) may be provided by use of a hex buffer part 74LS07. The $V_{cc}$ port of this part may be connected to a positive 5 volt source, the ground port may be grounded and a 0.1 microfarad capacitor (223) may be connected therebetween.

As described above, four of these buffers (222) will be used to interface the data buss (49). In addition, a fifth buffer (224) connects to address line $A_0$ of the address buss (51) as denoted by the character N (see FIG. 5). The sixth buffer (226) connects to address line $A_1$ of the address buss (51) as denoted by the character P (see FIG. 5). The outputs of all six buffers (222, 224 and 226) connect through 10k ohm pull up resistors (227) to a positive 5 volt source. The outputs of the four buffers (222) connected to the data buss (49) connect to the four data inputs of the display driver (37). The output of the two buffers (224 and 226) that connect to the address buss (51) connect to the two digit select code bit inputs of the display driver (37).

The first bit chip select code input port to the display driver (37) connects through a 10k ohm pull up resistor (228) to a positive 5 volt source and to an output port of a 1 of 16 decoder/demultiplexor (172) contained in the central processing unit (21) as denoted by the characters GG. The second bit chip select code input port to the display driver (37) connects through a 10k ohm pull up resistor (229) to a positive 5 volt source and to the output of a first NAND gate (196) contained in a quad NAND gate assembly (194) included in the keyboard unit (13).

The $V_{cc}$ port of the display driver (37) may be connected to a positive 5 volt source and through a 0.1 microfarad capacitor (231) to ground. The ground port may be grounded as well. The oscillator port may be connected through a 20 picofarad capacitor (232) to a positive 5 volt source. Finally, the four sets of seven segment output data and the back plane port may be appropriately connected to the liquid crystal display unit (36).

It may be desirable to provide back lighting for the display (36) by providing two or more 6.3 volt lamps as shown by the numeral 233. Such lamps will typically be biased between ground and a positive 5 volt source.

In order to provide appropriate decimal, colon and blanking control, the four data outputs from the hex buffer part inverters (222) may also be connected to the data inputs of a hex latch such as part MC14174B (203). The clock port of this latch (203) may be connected through a 10k ohm pull up resistor (234) to a positive 5 volt source and to the output of the third NAND gate (197) contained in a quad NAND gate part (194) included in the keyboard unit (13) as denoted by the character X. The reset port of the latch may be connectd to the reset port of the microprocessor (22) as denoted by the character Y.

The $V_{cc}$ port of the latch (203) may be connected to a positive 5 volt source and the ground port may be grounded. The four output ports associated with the four utilized input ports each connect to one input of a two input OR gate (236, 237, 238 and 239) respectively. The remaining inputs to each OR gate are then connected together and to the back plane data output from the display driver (37).

Such OR gates may be provided by use of part 4071. The $V_{cc}$ port may be connected to a positive 5 volt source, the ground port may be grounded and a 0.1 microfarad capacitor (241) may be connected therebetween.

The output of the first OR gate (236) connects to the colon control port of the liquid cyrstal display (36). The output of the second OR gate (237) control the first decimal point of the display (36). The output of the third OR gate (238) controls the second decimal point, and the output of the fourth OR gate (239) controls the third decimal point.

Figure 5:
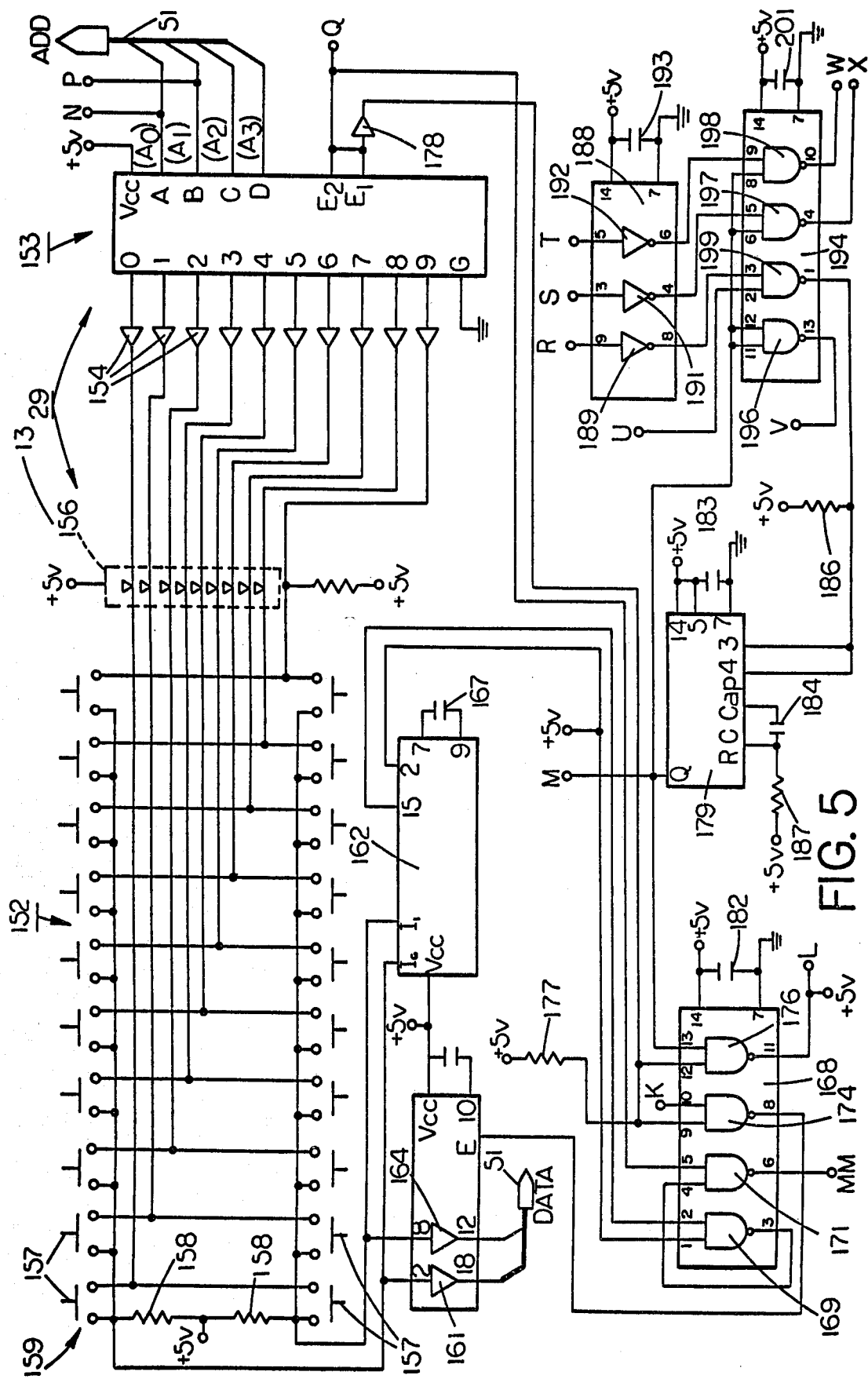
FIG. 5 is a schematic representation of the keyboard unit.

Since the display indication LED unit (38) and the latch and driver unit (39) of the display unit (16) are substantially structurally identical with the operating mode LEDs (32) and their latch and driver (31) as found in the keyboard unit (13) (FIG. 6), they need not be described again here in detail, except to note that the clock input of the hex D flip flop (181) for the latch and driver (39) of the display unit (16) connects instead to the output of a fourth NAND gate (198) contained in a quad NAND gate unit (194) as designated in FIG. 5 by the character W.

Figure 9:
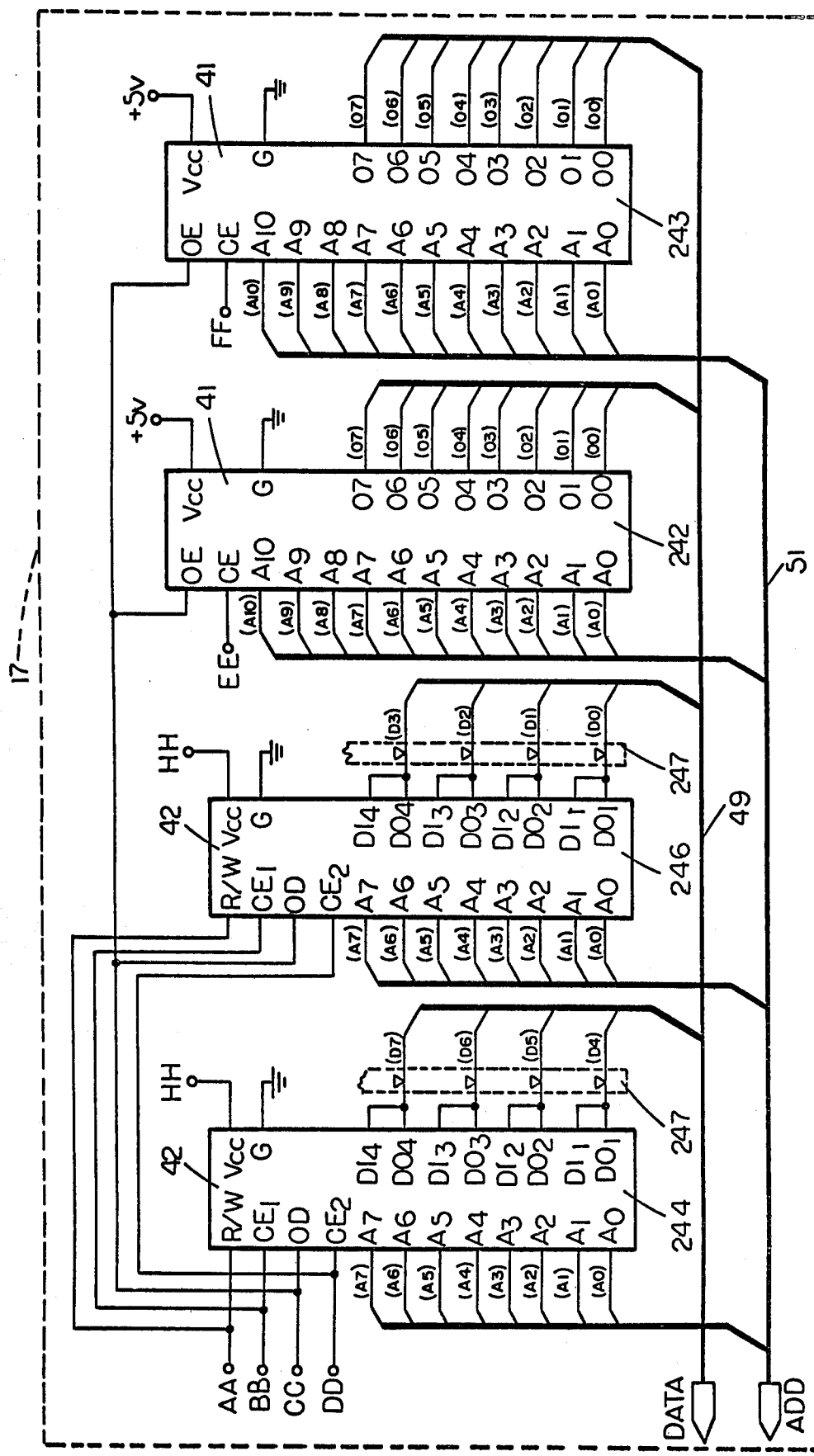
FIG. 9 is a schematic representation of the memory unti.

The memory unit (17) may now be described with reference to FIG. 9. The memory unit (17) includes generally non-volatile memory (41) and volatile memory (42).

The non-volatile memory (41) may be comprised of two 16k ultra-violet erasable PROM parts such as the 2716 as manufactured by Intel (242 and 243). Each such part (242 and 243) may have its $V_{cc}$ port connected to a positive 5 volt source and its ground port grounded. The output enable ports may be connected together and connected to the central processing unit (21) as designated by the characters CC and as described below.

In addition, ten of the available address input ports to each part (242 and 243) may be connected to address lines $A_0$ through $A_{10}$ of the address buss (51) as depicted. The eight data input/output ports may be connected to data lines $D_0$ through $D_7$ of the data buss (49) as depicted.

Finally, the chip enable port of the first EPROM (242) may be connected to an output of the one-of-sixteen decoder/demultiplexer (172) contained in the central processing unit (21) as denoted by the characters EE. Simialrly, the chip enable port of the second EPROM (243) connects to another output of the one-of-sixteen decoder/demultiplexer (172) as denoted by the characters FF.

The volatile memory (42) may be provided by the use of two 256×4 bit static RAM parts (244 and 246). The eight address ports of each RAM (244 and 246) connect to address lines $A_0$ through $A_7$ of the address buss (51).

The eight data output ports of each RAM are joined in pairs, such that the first two data output ports of the first RAM (244) connect through a 3.3k pull up resistor (247) to a positive 10 volt source and to the $D_4$ data line. The next two data outputs are similarly connected to the $D_5$ data line, the next pair of outputs are similarly connected to the $D_6$ data line and the last pair of outputs are connected to the $D_7$ data line. In a similar manner, data lines $D_0$ through $D_3$ are connected to the eight data outputs of the second RAM (246).

The $V_{cc}$ ports of both RAMs (244 and 246) are connected to the power outage unit (19) as described below with reference to FIG. 3 and as denoted by the characters HH. The ground ports may be connected to ground. The read/write ports of both RAMs are connected to the central processing unit (21) as designated by the characters AA and as described below. Simiarly, both chip enable ports of both RAMs are connected to the central processing unit (21) as designated by the characters BB and DD and as described in more dertail below. Finally, the output disable ports of both are connected in common with the output enable ports of the non-volatile memory (41).

The real time clock unit (18) will now be described with reference to FIG. 10. The real time clock unit (18) may be comprised of a MSM5832 microprocessor real time clock/calendar (248) as manufactured by OKI. The two crystal oscillator ports have connected between them a 32.768 kilohertz crystal (249). In addition, one of the crystal ports connects through a 20 picofarad capacitor (251) to ground, and the remaining port connects through a variable 12 to 25 picofarad capacitor (252) to ground. The adjustment port and ground port may also be connected to ground. The $V_{cc}$ port may be connected to the power outage unit (19) as represented by the characters HH and as described further below.

The various output ports of the clock (248), including the address inputs, the write port, the read port, the data input/output ports, the test port, the count hold enable port, and the chip select port are all connected through individual 10k ohm pull up resistors (253) to a positive 5 volt source and then to corresponding inputs of a peripheral interface adapter (173) contained in the central processing unit (21).

More particularly, the real time clock address, data, test, count hold enable and read enable output ports connect to bi-directional peripheral interfaces of the peripheral interface adapter (173). The write enable port of the clock (248) connects to the CB2 input port of the PIA (173). The CB1 port of the PIA (173) connects to the D2 data port of the clock (248). Finally, the chip select port of the clock (248) connects to the non-maskable interrupt port of the microprocessor (22).

Figure 3:
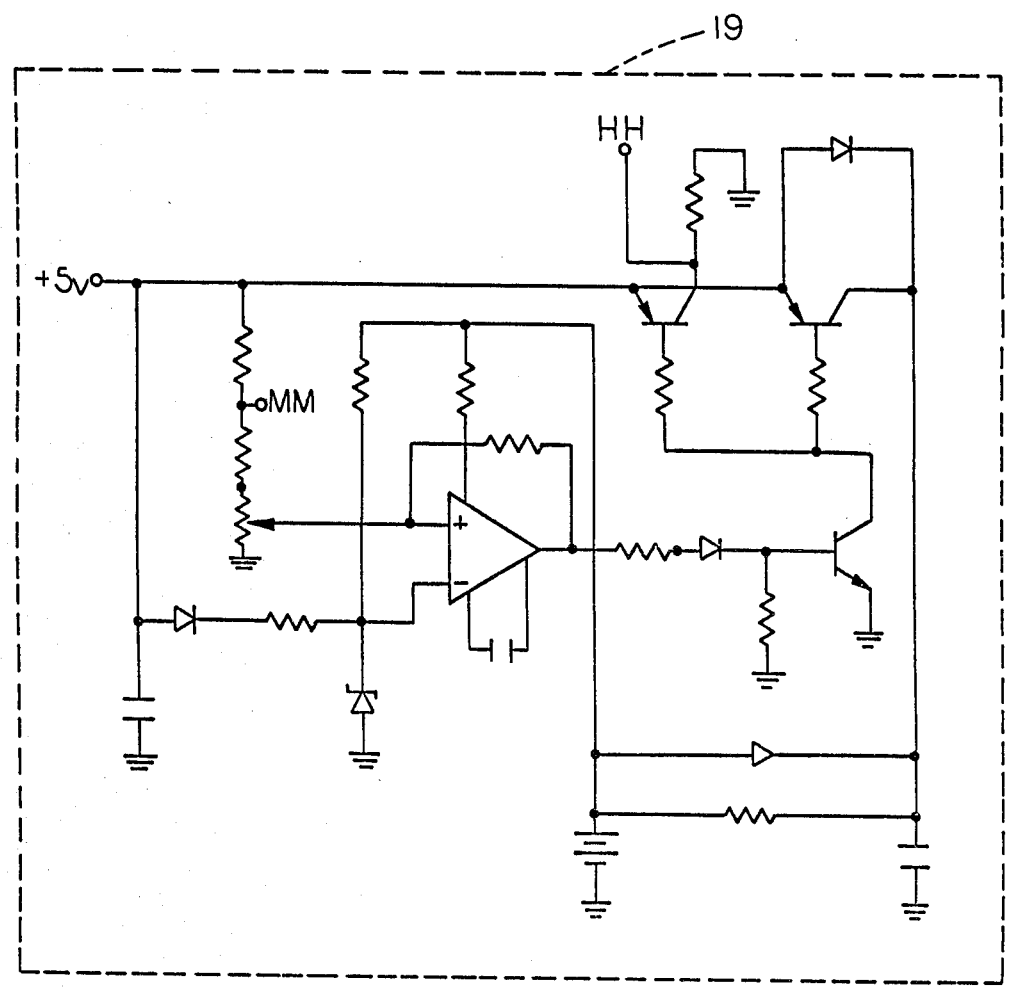
FIG. 3 is a schematic representation of the power outage unit.

Referring now to FIG. 3, the power outage unit (19) will be described. The unit may be formed about an operational amplifier (254) such as part 3078, and about 3 transistors (256, 257 and 258). The inverting input of the operational amplifier (254) connects through a 3.3k ohm resistor (259) and a forward biased diode (261) to a positive 5 volt source. In addition, the inverting input connects to a grounded zenor diode (262) such as part LM385. The non-inverting input of the operational amplifier (254) connects to the variable leg of a 10k ohm resistor (263).

One leg of this variable resistor (263) connects to ground and the remaining leg connects to a pair of series connected 4.99k ohm resistors (264 and 266). The remaining leg of these series connected resistors (264 and 266) connects to the positive 5 volt source. The juncture between these two series connected resistors (264 and 266) connects to the CA1 port of the peripheral interface adapter (173) contained in the central processing unit (21) as designated by the characters MM.

A 150k ohm feedback resistor (267) connects between the non-inverting input and the output of the operational amplifier (254). The output then connects through a 56k ohm resistor (268) and a diode (269) to the base of an emitter-grounded NPN transistor (258) such as a PN3567. The base of this transistor (258) also connects through a 220k ohm resistor (271) to ground.

The collector of this transistor (258) connects through one 10k ohm resistor (272) to the base of another transistor (256) and through a second 10k ohm resistor (273) to the base of yet another transistor (257). Both of these transistors (256 and 257) may be comprised of part 2N3638. The emitter of the first transistor (256) connects to the positive 5 volt source, as does the emitter of the second transistor (257). The collector of the first transistor (256) connects through a 330 ohm resistor (274) to ground and also to an emergency power node designated by the characters HH. The emitter of the second transistor (257) connects through a diode (275) to the collector of that same transistor and through a 4.7 microfarad capacitor (276) to ground.

The collector of this latter transistor (257) also connects to a 120 ohm resistor (277) and diode (278) that are connected in parallel to a 3.6 volt battery (279).

This battery (279) also connects through a 100k ohm resistor (281) to the inverting input of the operational amplifier (254) and through a 4.7 Mega ohm resistor (282) to pin 5 of the operational amplifier (254).

Finally, it may be noted that a 50 picofarad capacitor (283) may be connected between pins 1 and 8 of the operational amplifier (254). Also, a 0.1 microfarad capacitor (284) may be connected between the positive 5 volt source and ground.

Figure 10:
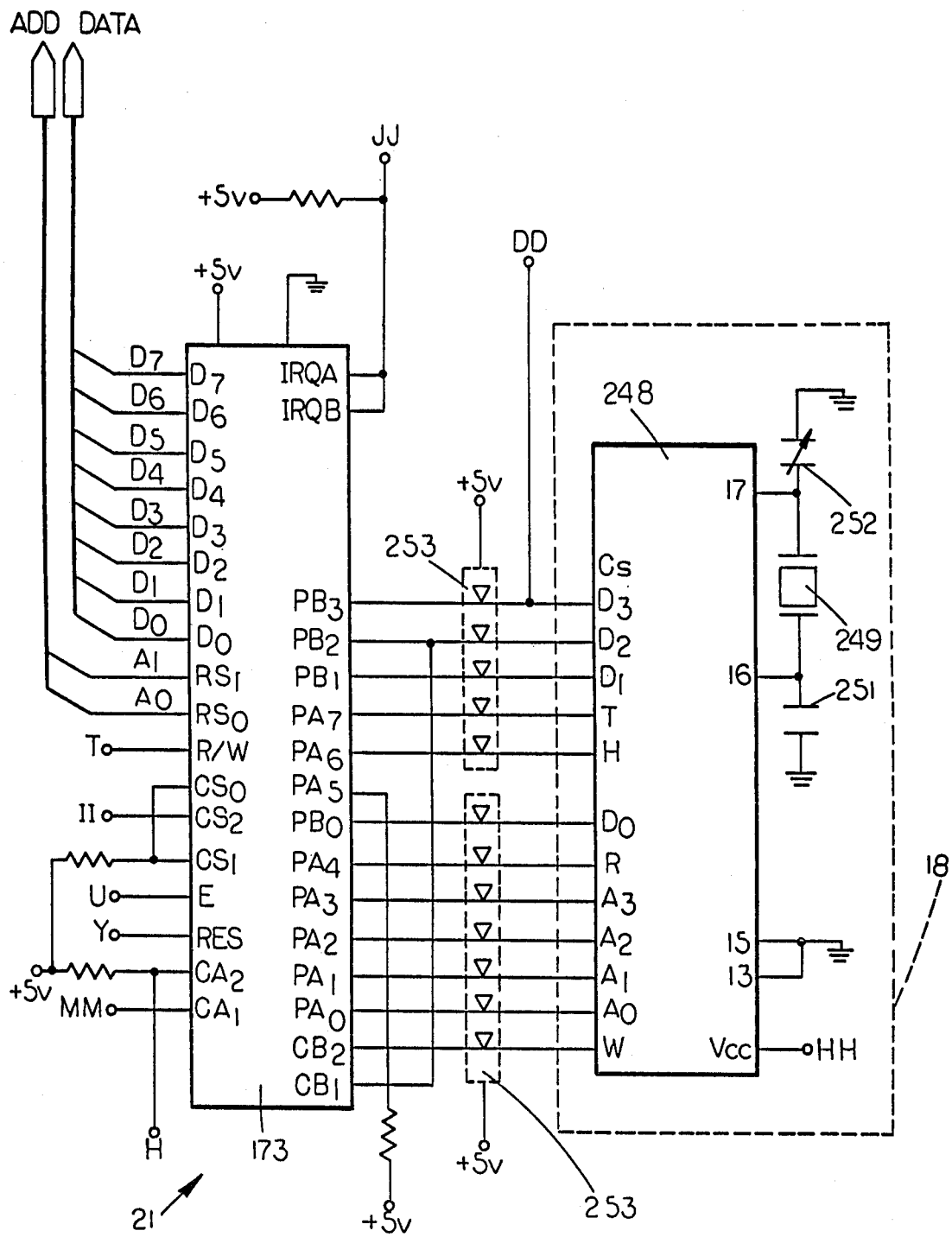
FIG. 10 is a schematic representation of the real time clock unit and part of the central processing unit.

The emergency power outage node designated by the characters HH connects to the $V_{cc}$ ports of the volatile memory units (42) of the memory unit (17) (see FIG. 9) and to the $V_{cc}$ port of the real time clock (248) as shown in FIG. 10. The use of the power outage unit (19) will be described in more detail below.

Figure 11:
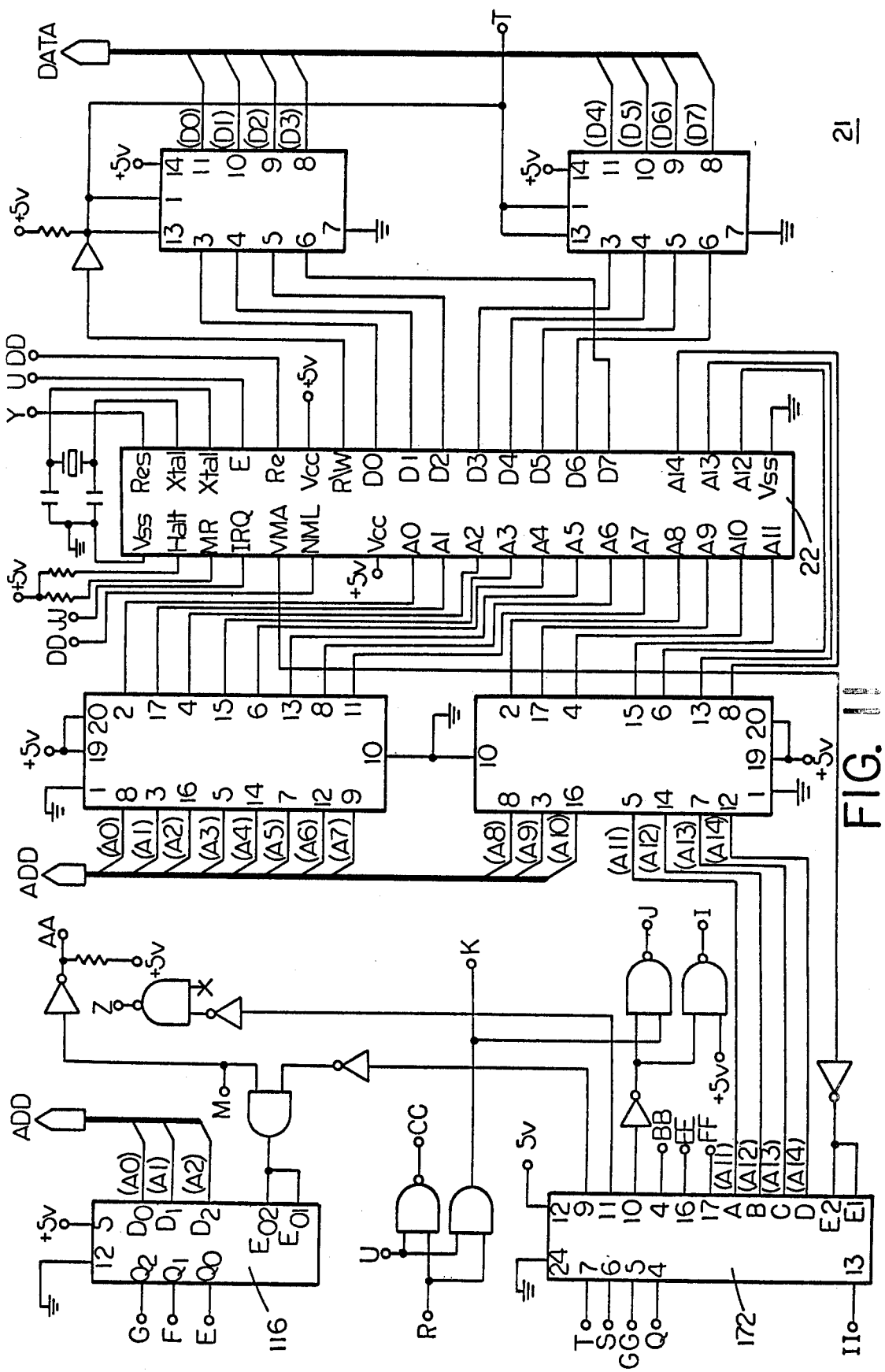
FIG. 11 is a schematic representation of the remainder of the central processing unit.

Referring now to FIGS. 10 and 11, the central processing unit (21) will now be described. The ceneral processing unit (21) may be formed generally about a microprocessor (22) (FIG. 11) such as the MC6802 as manufactured by Motorola. The 8 input/output data ports of the microprocessor (22) are connected through appropriate data buffers (47) to the data buss (49).

These data buffers may be provided by use of part 74LS243, and in this application two of these parts (286 and 287) will be required. The data lines $D_0$ through $D_3$ may be connected to the first buffer unit (286) and the remaining data lines may be connected to the second buffer unit (287). The $V_{cc}$ port of both buffers may be connected to a positive 5 volt source and the ground port may be grounded. Pins 13 and 1 of both buffers may be connected in parallel and connected through a 1k ohm resistor (288) to a positive 5 volt source. In addition, these pins may be connected to the read/write port of the peripheral interface adapter (173) described more fully below.

Fifteen addres ports of the microprocessor (22) may be connected to the address buffer (46). The address buffer may be comprised of two three state octal buffers such as part 74LS241. All eight address ports of the first address buffer (289) may be connected to the microprocessor address ports that relate to address lines $A_0$ through $A_7$. The second address buffer (291) may be connected to the remaining 7 utilized address ports ($A_8$ through $A_{14}$) of the microprocessr (22).

The outputs of the two address buffers (289 and 291) are then combined such that address lines $A_0$ through $A_{10}$ are connected to the address buss (51) and the remaining four address ports relating to address lines $A_{11}$ through $A_{14}$ are connected through the second address buffer (291) to a one-of-sixteen decoder/demultiplexer (172).

Both enable inputs to the decoder/demultiplexer (172) are connected together and through an inverter (292) to the valid memory address port of the microprocessor (22).

Output pin 17 of the decoder/demultiplexer (172) connects to the chip enable port of the second EPROM (243) contained in the memory unit (17) as denoted by the characters FF. Output pin 16 connects to the chip enable port of the first EPROM (242) as denoted by the characters EE. Output pin 4 of the decoder/demultiplexer (172) attaches to the first chip enable port of both RAM units (244 and 246) of the memory unit (17) as denoted by the characters BB.

Output pin 7 of the decoder/demultiplexer (172) connects to the input of the third inverter (192) of the hex inverter part (188) contained in the display unit (13) as denoted by the character T. Output pin 6 connects to the input of the second inverter (191) of the same part (188) as denoted by the character S. Output pin 4 of the decoder/demultiplexer (172) connects to the second enable port of the 4/16 decoder (153) contained in the keyboard unit (13) as denoted by the character Q. Output pin 5 of the decoder/demultiplexer (172) connects to the first chip select bit port of the display driver (37) contained in the display unit (16) as denoted by the characters GG.

Output pin 10 of the decoder/demultiplexer (172) connects through an inverter (293) to one input port of both a first and second NAND gate (294 and 296). The remaining input to the second NAND gate (296) connects to a positive 5 volt source. The remaining input to the first NAND gate (294) connects to the output of an AND gate (297) described in more detail below. The output of the first NAND gate (294) connects to the read port of the analog-to-digital converter (28) contained in the data conditioning unit (12) as denoted by the character J. The output of the second NAND gate (296) connects to the CS port of the analog-to-digital converter as denoted by the character I.

The AND gate (297) mentioned above has one input that connects in common with the input to a third NAND gate (298) to the input of a first inverter (189) contained in an inverter unit (188) included in the keyboard unit (13) as denoted by the character R. The remaining input to both the AND gate (297) and the third NAND gate (298) connects to the input of a second NAND gate (199) in a quad NAND gate unit (194) also contained in the keyboard unit (13) as denoted by the character U.

The output of the AND gate (297) connects to the input of a third NAND gate (174) contained in a quad NAND gate unit (168) included in the keyboard unit (13) as denoted by the character K. The output of the third NAND gate (298) connects to the output disable port of both RAM units (244 and 246) and to the output enable ports of both EPROM units (242 and 243) of the memory unit (17) as denoted by the characters CC.

Output pin 11 of the decoder/demultiplexer (172) connects through an inverter (299) to one input of a two input NAND gate (301), the remaining input of which is unconnected and the output of which connects to the CP port of the latch (34) contained in the output control unit (14) as denoted by the character Z.

Output pin 9 of the decoder/demultiplexer (172) connects through an inverter (302) to one input of a second AND gate (303), the output of which connects to both enable ports of a four bit latch (116). The remaining input to this AND gate (303) connects to the output of a one shot monostable multi-vibrator (179) contained in the keyboard unit (13) as denoted by the character M, and also through an inverter (304) and a 3.3k resistor (306) to the read/write port of both RAM units (244 and 246) of the memory unit (17) as denoted by the characters AA.

The four bit latch (116) mentioned above may be provided by part 74LS75. The three address ports of the latch (116) may be connected to address lines $A_0$, $A_1$ and $A_2$ of the address buss (51). The $V_{cc}$ port may be connected to a positive 5 volt source and the ground port may be grounded. The three utilized output ports connect to the three address ports of the muliplexer unit (24) contained in the data conditioning unit (12) as denoted by the characters E, F and G.

Referring now to FIG. 10, the description of the central processing unit (21) will continue. FIG. 10 discloses a peripehral interface adapter (173) such as the MC6821 part manufactured by Motorola. As described above, many of the bi-directional peripheral interface ports of the PIA (173) connect with output ports of the real time clock (248). Both interrupt outputs of the PIA (173) are connected together through a 10k ohm resistor (307) to a positive 5 volt source. The interrupt outputs are additionally connected to the interrupt port of the microprocessor (22) as denoted by the characters JJ.

The CA1 port connects to the power outage unit (19) as denoted by the characters MM. The CA2 port connects to the BS port of the analog-to-digital converter (28) contained in the data conditioning unit (12) as denoted by the character H. The CA2 port also connects through a 10k ohm resistor (308) to a positive 5 volt source.

The reset port of the PIA (173) connects to the reset port of the microprocessor (22) as denoted by the character Y. The enable port of the PIA (173) connects to the enable port of the microprocessor (22) as denoted by the character U. The CS1 port of the PIA (173) and the CS0 port are connected together and through a 1k ohm resistor (309) are connected to a positive 5 volt source. The CS2 port of the PIA (173) connects to an output port of the 1 of 16 decoder/demultiplexer (172) contained in the central processing unit (21) as denoted by the characters II.

The read/write port of the PIA (173) connects to the input port of a third inverter (192) contained in an inverter unit (188) located in the keyboard unit (13) as denoted by the character T. The ROS and RSI ports of the PIA (173) are connected to address lines $A_0$ and $A_1$, respectively, of the address buss (51). The eight bi-directional data ports of the PIA (173) are connected to the eight data lines of the data buss (49). Finally, it may be noted that the PA5 output port may be connected through a 3.3k ohm resistor (311) to a positive 5 volt source.

Figure 13:
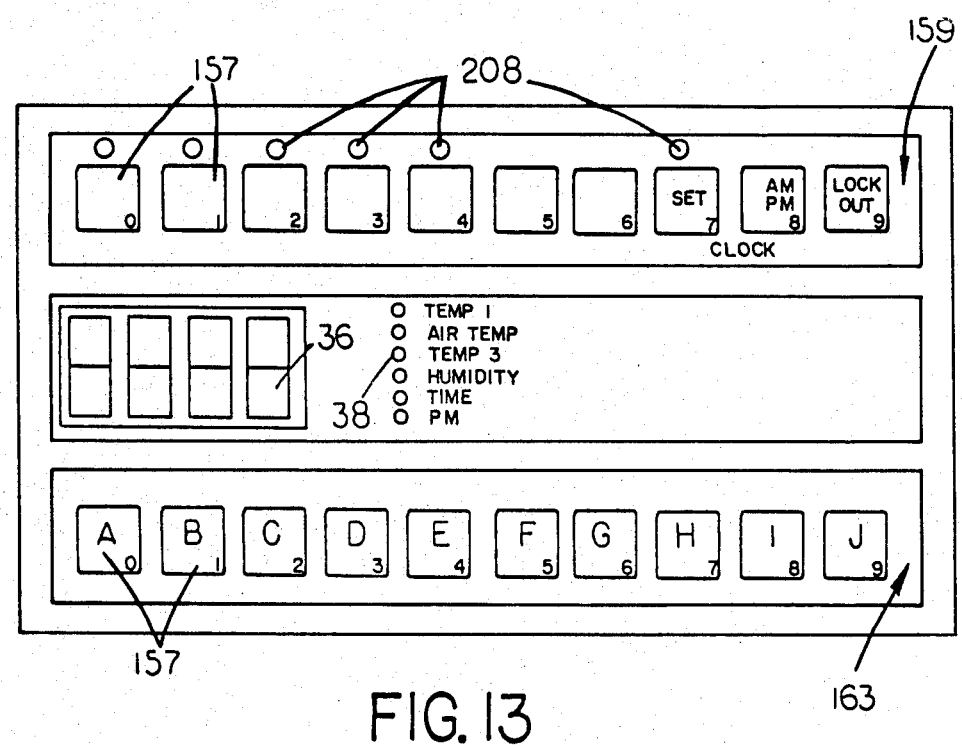
FIG. 13 is a block diagram of the keyboard of the invention.

A sample keyboard and display may be seen as depicted in FIG. 13. The first series (159) of normally open push button switches (157) are depicted as the top row of switches numbered 0 through 9. The second series (163) of switches (157) are depicted as the lower row of switches lettered A through J. The six operating mode LEDs (208) are shown as depicted above the switches numbered 0, 1, 2, 3, 4 and 7. The six LEDs associated with the display unit (38) are shown vertically arrayed between the switches. Finally, the four digit LCD display (36) may be seen as disposed between the two series of switches (159 and 163) with the digits 8888 appearing thereon.

The computer program containing the operating instructions for the microprocessor (22) are attached hereto as a microfiche appendix. This specific program is not believed critical to an understanding of the invention, but is included as an appendix in order to assure compliance with the best mode and enabling requirements of 35 U.S.C. 112.

Referring again to FIGS. 12 and 13, the use of the apparatus in a method of conditioning grain will be described. To begin, an operator fills a grain bin (301) with grain (300) thereby forming a grain mass. A first temperature sensor for sensing ambient temperature will be located on the exterior of the grain bin as represented by the numeral 302. A second temperature sensor will be located to sense exhuast temperatures (303), a third temperature sensor will be located in the grain (300) itself as designated by the numerals (304), and finally a humidity sensor will be located exterior the bin as indicated by the numerals (306).

Initially, none of the substative keys on the keyboard (13) are functional. This aids in preventing any accidental programming errors. This means, however, that the keyboard must first be opened. The keyboard may be opened by simultaneously closing the switch numbered 9 and the switch lettered J.

The correct time of day may then be initially set by first closing switch A. This prepares the microprocessor to receive the time set information. The correct time in hours and minutes may then be introduced by using the numbers on the lower row of switches. For instance, if the operator wished to enter 4:36, he would depress switches A, E, D and G. Switch 8 on the upper row may then be depressed if necessary to designate a.m. or p.m. One of the display mode LEDs (38) lights to indicate a p.m. setting. Finally, the operator presses switch 7 on the upper row to set the time and then switch 9 to lock the keyboard again. Following this operation, the correct time of day has been entered into the system, and the real time clock unit (18) will continue to advance the time such that the central processing unit (21) will always be provided with the correct time of day.

In order to begin mode 1 modified low temperature drying, the operator must again open the keyboard by simultaneously closing switch 9 and switch J. Following this, the operator should push switch 0 in the top row (159).

If the operator wishes to provide a short off time during peak power usage hours, switch B may be closed in the lower row (163) and the off time may be programmed by use of the numbers on the bottom row of switches (163). For instance, if the operator wished the fans to cease operation at 4:15, he would close in sequence switch A, E, B and F. The set switch in the top row (159) should then be closed. To program the time when the fans should start operation after the peak power usage period, switch C should be closed. The on time may then be programmed above as with the off time, and the set switch closed. The lock out switch should then be closed to again lock the keyboard.

So programmed, the system will operate the grain drying fans continuously, excpet during the programmed off period to accomodate the peak power time. In addition, the system will energize the grain drying lamps at any time that the fans are on and the central processing unit (21) detects that the temperature sensor at the exhaust port of the grain bin (303) indicates a temperature that is greater than the ambient temperature less 4 degrees Fahrenheit.

The system will continue to so operate until the operator stops mode 1 operation and initiates mode 2 energy exchange. This change should be made when approximately the bottom two-thirds of the grain mass (300) has an average moisture content of approxiamtely 14 to 16%.

To begin mode 2 enegy exchange, the operator must again first open the keyboard by simultaneously closing switch 9 and switch J. The operator must then close switch C in the lower row of switches (163). The on and off times must then be set. To set the start time, switch D in the lower row (163) should be closed and the time when the fans should start should be entered by use of the numbers in the lower row. Following this, the set switch should be closed. Similary, the stop time may be entered by first closing switch E and by closing the set switch after entering the time. The lock out switch may then be closed to lock the keyboard.

In this mode, the fans will start and stop at the preset times. In addition, unless the peak power period has been reset or terminated, the fans will stop during the preset peak power usage period.

In this mode, the central processing unit (21) will store in the memory unit (17) the ambient temperature at the times the fans were stopped. Then, at the time when the fans should again be started, the computer will begin comparing the ambient temperature with the previously stored ambient temperature. More particularly, the microprocessor (22) will add to the previously stored ambient temperature a preset safe temperature constant, typically a figure between $-15$ to $+7$ degrees Fahrenheit. If the then current ambient temperature exceeds the sum of the previously stored ambient temperature and the preset safe temperatue constant, then the fans will not be allowed to start.

The central processing unit (21) will continue to monitor the ambient temperature and to compare that ambient temperature with the summed stored ambient temperature and preset safe temperature range. If and when the ambient temperature does fall below that figure, the fans will be allowed to start and to run until the scheduled stop time.

Since prolonged storage without aeration may be more detrimental to the grain than the use of unsuitable ambient air, the central processing unit (21) will override the stop order at a preselected start time such as 8 a.m. In other words, if the fans have been unable to operate since the scheduled start time because of inappropriate temperature conditions, the fans will still be started at the override start time and will be allowed to run until the scheduled stop time.

One other override feature may be noted. The fans will not be allowed to start in this mode under any conditions unless the ambient temperature exceeds some preset absolute minimum temperature, typically 10 degrees Fahrenheit.

The system will continue to operate in mode 2 energy exhcange until the operator halts use of this mode. Mode 2 operation should be terminated and mode 3 automatic aeration should be begun when approximately the top four feet of the grain mass (300) exhibits an average content of approximately 14 to 16%.

To initiate the winter cycle of mode 3 automatic aeration, the operator first opens the keyboard as described above, and then closes switch 2 in the upper row (159). The operator then closes switch D in the lower row (163) and selects the time when the fans should come on. Following this, the operator closes the set switch.

The operator then closes switch E in the lower row (163) and selects the off time. Again the set switch should be closed following this selection. The operator then closes switch I and enters the desired number of days between cycles. The set switch should be closed following this.

Typically, for winter aeration, the system will be set to be on for 8 to 10 hours every 14 days.

The upper and lower temperatures may be set by first closing switch J followed by closing switch A. The preset minimum temperature may then be entered followed by a closure of the set switch. Switch B should then be closed and the preset maximum temperature may then be entered. The set switch should then be closed. Finally, to set the absolute maximum temperature for winter aeration, switch C should be closed and the desired absolute maximum temperature may be entered followed by a closure of the set switch. Finally, switch J should be closed to leave this mode and the lock out switch should be closed to lock the keyboard.

So programmed, the fans will start every 14 days and run for 10 hours if the ambient temperature falls between the set range, such as between 10 degrees Fahrenheit and 30 degrees Fahrenheit. If the fans are started, and the ambient temperature exceeds the absolute maximum temperature, such as 40 degrees Fahrenheit, then the fans will be stopped. The fans wil not be allowed to start again until the ambient temperature falls lower than 30 degrees Fahrenheit. If this happens, the fans will restart and continue operating until the preset time to stop.

If the fans have only operated for a total time of less than four hours during a given cycle, the system will initiate another run cycle the following day. Such recycling will occur until one run has succeeded for more than four hours. The system will then remain quiescent until the next scheduled start time.

Spring automatic aeration may be programmed exactly as above with winter aeration, except that instead of initially closing switch 2, switch 3 should be closed. In addition, no absolute maximum temperature need be set for spring aeration.

Finally, summer aeration may be set as above for spring, except that instead of closing switch 3 initially, switch 4 should be closed.

It should be noted that if the central processing unit (21) detects at any time that the temperature of the grain exceeds 80 degrees Fahrenheit, the fans will be atomatically started and will run until the temperature of the grain has fallen below 60 degrees Fahrenheit.

Through the use of this sytem, quality conditioned grain may be obtained and stored with a minimum of energy consumption.

Obviously, many modifications and variations of the present invention are possible in light of the above teachings. For instance, mode 2 energy exchange and mode 3 aeration could be used following a variety of different initial drying methods, and need not be limited only to use with low temperature drying. It is therefore to be understood that, within the scope of the appended claims, the invention may be practiced otherwise than as specifically described.

I claim:

1. A method of operating grain drying fans in a grain drying bin to assist in drying the grain mass with minimal energy usage, comprising:
   (a) providing a preset start time for the daily starting of said fans during a part of the day when exterior ambient temperature would normally be expected to be near the low temperature for the day;
   (b) providing a preset stop time for the daily stopping of said fans before late afternoon;
   (c) providing a preset safe temperature constant;
   (d) constant determining the correct time of day;
   (e) constantly determining the current ambient temperature;
   (f) repetitively comparing the correct time of day with the preset start time, and the preset stop time;
   (g) starting said fans when a said preset start time comparison indicates equivalence between the correct time of day and the preset start time;
   (h) stopping said fans when a said preset stop time comparison indicates equivalence between the correct time of day and the preset stop time, and recording the ambient temperature at the time said fans are stopped;
   (i) calculating the safe temperature range by summing the ambient temperature at the time said fans were stopped with the preset safe temperature constant;
   (j) upon a said preset start time comparison, next indicating equivalence between the correct time of day and the preset start time;
   (k) repetitively comparing the current ambient temperature with the safe temperature range;
   (l) preventing starting of said fans so long as the ambient temperature exceeds the safe temperature range, and starting said fans if and when the ambient temperature is lower than the safe temperature range; and
   (m) repeating steps (h) through (j).

2. The method of claim 1 and further including:
   (a) providing an automatic override start time;
   (b) repetitively comparing the correct time of day with the automatic override start time; and
   (c) starting said fans when a said automatic override start time comparison indicates equivalence between the correct time of day and the automatic override start time, if the fans have not been started earlier because the then current ambient temperature exceeded the safe temperature range.

3. The method of claim 1 and further including:
   (a) providing a preset minimum temperature;
   (b) repetitively comparing the current ambient temperature with the preset minimum temperature and rendering said fans inoperable during any time period the ambient temperature is less than the preset minimum temperature.

4. A method of operating grain drying fans in a grain drying bin to assist in drying the grain mass with minimal energy usage and with the aid of a digital computer, comprising:
   (a) providing said computer with a preset start time for the daily starting of said fans during a part of the day when exterior ambient temperature would normally be expected to be near the low temperature for the day;
   (b) providing said computer with a preset stop time for the daily stopping of said fans before late afternoon;
   (c) providing said computer with a preset safe temperature constant;
   (d) constantly determining the correct time of day;
   (e) constantly providing said computer with the correct time of day;
   (f) constantly determining the current ambient temperature;
   (g) constantly providing said computer with the current ambient temperature;
   (h) repetitively comparing in the computer the correct time of day with the preset start time, and the preset stop time;
   (i) starting said fans automatically when a said preset start time comparison indicates equivalence between the correct time of day and the preset start time;
   (j) stopping said fans automatically when a said preset stop time comparison indicates equivalence between the correct time of day and the preset stop time, and storing in a memory for use by said computer the ambient temperature at the time said fans are stopped;
   (k) calculating in said computer the safe temperature range by summing the ambient temperature at the time said fans were stopped with the preset safe temperature constant;
   (l) upon a said preset start time comparison, next indicating equivalence between the correct time of day and the preset start time:
      (i) repetitively comparing in the computer the then current ambient temperature with the safe temperature range; and
      (ii) preventing automatic starting of said fans so long as the ambient temperature exceeds the safe temperature range, and automatically starting said fans if and when the ambient temperature is lower than the safe temperature range; and
   (m) repeating steps (j) through (l).

5. The method of claim 4 and further including:
   (a) providing said computer with an automatic override start time;
   (b) repetitively comparing in the computer the correct time of day with the automatic override start time; and
   (c) starting said fans automatically when a said automatic override start time comparison indicates equivalence between the correct time of day and the automatic override start time, if the fans have not been started earilier because the then current ambient temperature exceeded the safe temperature range.

6. The method of claim 5 and further including:
   (a) providing said computer with a preset minimum temperature;
   (b) repetitively comparing in the computer the current ambient temperature with the preset minimum temperature and automatically rendering said fans inoperable during any time period the ambient temperature is less than the preset minimum temperature.

7. A method of operating grain drying fans in a grain drying bin to assist in the aeration of a grain mass during storage with minimal energy usage, comprising:
   (a) providing a preset start time for starting said fans;
   (b) providing a preset stop time for stopping said fans;

(c) providing a preset number of days between said preset stop time and the next preset start time;

(d) providing a preset minimum temperature;

(e) providing a preset maximum temperature;

(f) constantly determining the correct time of day;

(g) constantly determining the correct ambient temperature;

(h) constantly determining the number of days that have elapsed since the fans were last shut off;

(i) repetitively comparing the number of days that have elapsed since the fans were last shut off with the preset number of days and repetitively comparing the correct time of day with the preset start time and the preset stop time;

(j) repetitively comparing the current ambient temperature with the preset minimum temperature and the preset maximum temperature;

(k) starting said fans when:
  (i) a said number of days comparison indicates equivalence between the number of days that have elapsed since the fans were last shut off and the preset number of days; and
  (ii) a said preset start time comparison indicates equivalence between the correct time of day and the preset start time; and
  (iii) a said preset maximum temperature comparison indicates that the current ambient temperature does not exceed the preset maximum temperature; and
  (iv) a said preset minimum temperature comparison indicates that the current ambient temperature does not exceed the preset minimum temperature;

(l) stopping said fans when a said preset stop time comparison indicates equivalence between the correct time of day and the preset stop time; and (m) repeating steps (k) through (l).

8. The method of claim 7 and further including:

(a) providing a minimum fan run time constant;

(b) initiating a timer upon starting said fans for monitoring the elapsed time said fans operate between preset start time and said preset stop time;

(c) following a said preset stop time comparison indicating equivalence between the correct time of day and the preset stop time, comparing in the computer the minimum fan operate time constant with the elapsed fan operate time; and (d) repeating steps (k) (ii), (iii) and (iv) and (l) if said elapsed fan operate time does not exceed said minimum fan operate time constant.

9. A method of operating grain drying fans in a grain drying bin to assist in the automatic aeration of a grain mass drying storage with minimal energy usage and with the aid of a digital computer, comprising:

(a) providing said computer with a preset start time for starting said fans;

(b) providing said computer with a preset stop time for stopping said fans;

(c) providing said computer with a preset number of days between said preset stop time and the next preset start time;

(d) providing said computer with a preset minimum temperature;

(e) providing said computer with a preset maximum temperature;

(f) constantly determining the correct time of day;

(g) constantly providing said computer with the correct time of day;

(h) constantly determining the current ambient temperature;

(i) constantly providing said computer with the correct ambient temperature;

(j) constantly determining the number of days that have elapsed since the fans were last shut off;

(k) constantly providing said computer with the number of days that have elapsed since the fans were last shut off;

(l) repetitively comparing in the computer the number of days that have elapsed since the fans were last shut off with the preset number of days and repetitively comparing in the computer the correct time of day with the preset start time and the preset stop time;

(m) repetitively comparing in the computer the current ambient temperature with the preset minimum temperature and the preset maximum temperature;

(n) starting said fans automatically when:
  (i) a said number of days comparison indicates equivalence between the number of days that have elapsed since the fans were last shut off and the preset number of days; and
  (ii) a said preset start time comparison indicated equivalence between the correct time of day and the preset start time; and
  (iii) a said preset maximum temperature comparison indicates that the current ambient temperature does not exceed the preset maximum temperature; and
  (iv) a said preset minimum temperature comparison indicates that the current ambient temperature does exceed the preset minimum temperature;

(o) stopping said fans automatically when a said preset stop time comparison indicates equivalence between the correct time of day and the preset stop time; and (p) repeating steps (n) through (o).

10. The method of claim 9 and further including:

(a) providing said computer with a minimum fan run time constant;

(b) initiating a timer in said computer upon starting said fans from monitoring the elapsed time said fans operate between said preset start time and preset stop time;

(c) following a said preset stop time comparison indicating equivalence between the correct time of day and the preset stop time, comparing in the computer the minimum fan operate time constant with the elapsed fan operate time;

(d) repeating steps (n) (ii), (iii) and (iv) and (o) if said elapsed fan operate time does not exceed said minimum fan operate time constant.

* * * * *